Patented Feb. 15, 1949

2,461,552

UNITED STATES PATENT OFFICE 2,461,552

ADHESIVE COMPOSITION CONTAINING AN ISOBUTENE-DIOLEFIN RUBBERY COPOLYMER AND A RESIN OCCURRING IN UTAH RESIN-BEARING COAL

Lino J. Radi, Union City, N. J., assignor to Interchemical Corporation, New York, N. Y., a corporation of Ohio No Drawing. Application March 27, 1946, Serial No. 657,604

6 Claims. (Cl. 260—27)

1

This invention relates to adhesive compositions and is particularly directed to an improved cement containing an isobutene-diolefin rubbery copolymer.

Rubber cements have been prepared heretofore from isobutene-diolefin rubbery copolymers, but such cements have not been entirely satisfactory. A particular disadvantage of these cements is their lack of sufficient and proper adhesiveness. This defect is accentuated upon aging and becomes especially serious in the case of laminated fabrics, the layers of which tend to separate within a relatively short time.

The films produced from such cements possess a fairly high degree of nerve, i. e., they exhibit long legs, and are, accordingly, relatively ineffective in providing any substantial and permanent degree of adhesion between two surfaces. Moreover, the rubbery copolymer, upon evaporation of the cement solvent from the film, has a decided tendency to spread even in the cold. This cold-flow characteristic of isobutene-diolefin rubbery copolymers likewise prevents the preparation of a good rubber cement therefrom.

A further drawback of these cements is their relatively high viscosity, which interferes with their ready application and prevents the building-up of a high solids content therein. These cements gel within a relatively short time upon standing and, accordingly, are not sufficiently stable for storage or packaging over long periods. Moreover, although the solubility of isobutene-diolefin rubbery copolymers in the customary rubber cement solvents such as naphtha, benzene, toluene, xylene, and the like is improved somewhat by milling, it is not increased nearly to the extent that the solubility of natural rubber is by milling.

A primary disadvantage of these prior cements, however, is that milling of the rubbery copolymer and any added compounding materials is required in their preparation. As is well known, not only is there the possibility that, because of undue heating of the rolls of a roll mill during the milling operation, the compounded copolymer may improperly or prematurely cure; but there is also the danger that, because of the static electricity generated during the milling operation, the cement solvents may become ignited and thereby cause a serious fire when the milled

2 copolymer compound is transferred from the rolls to the mixing equipment.

I have now found that a highly satisfactory rubber cement can be prepared from isobutene-diolefin rubbery copolymers, especially isobutene-butadiene rubbery copolymers, by incorporating therewith a Utah-type coal resin. The resulting cement is unusually adhesive, and the films produced therefrom do not deteriorate with age. By variation of the amount of the coal resin incorporated in the cement the degree of adhesiveness thereof can be readily and simply controlled. Moreover, the coal resin effects a marked reduction in the nerve of the resulting film, which exhibits very short legs; and the resistance of the rubbery copolymer to cold-flow is materially increased by the addition of the coal resin to the cement.

The viscosity of isobutene-diolefin rubbery copolymer cements is substantially lowered by the inclusion therein of this Utah-type coal resin, the presence of which, accordingly, permits additional copolymer as well as larger amounts of compounding materials to be incorporated in such a cement. A longer life and a greater stability are imparted to such cements by this coal resin, which prevents or inhibits gelling of the cement even upon standing for a relatively long period of time. In addition, the tensile strength and the shear adhesion of this type of cement are considerably improved by the incorporation of the coal resin therein.

A particular advantage of the use of a Utah-type coal resin in the preparation of isobutene-diolefin rubbery copolymer cements is that the milling of the copolymer with its attendant dangers can be entirely eliminated. In the production of such a cement in accordance with my invention, solution or dispersion of the rubbery copolymer in the cement solvent is simply effected by directly dissolving or dispersing the copolymer and the coal resin in the solvent. The coal resin appears to act as a solubilizer for or as a catalyst for the solution of the rubbery copolymer, and relatively large amounts of the copolymer can be dissolved in rubber cement solvents in this manner. Moreover, the use of the coal resin in the preparation of such cements insures against premature curing of the copolymer stock and provides for a better dispersion of the compounding materials throughout the cement.

A further advantage resulting from the incorporation of a Utah-type coal resin in an isobutene-diolefin rubber cement is the excellent solvent release obtained. This characteristic results in a fast-drying composition and, moreover, enables somewhat slower evaporating solvents to be substituted for a portion of the customary rubber cement solvents.

The coal resin increases materially the resistance of the isobutene-diolefin rubber cement to alkalies. It imparts greater thermosetting characteristics to such a copolymer. The low-temperature flexibility of such a cement is not affected by the coal resin. There is some indication that the resin even exerts a curing action on the copolymer. The hydrostatic properties of a fabric coated with the present composition are improved.

Moreover, it enables a greater amount of extender to be compounded with the cement with retention of its adhesiveness than that which can be tolerated by a similar cement not containing the coal resin. In fact, in some cases, its use actually increases the degree of adhesiveness of the original cement.

The present modified and improved rubber cement finds particular application in the lamination of rubber-coated fabrics and in the coating of materials like duck and nylon. It has been found especially useful in the production of satisfactory laminated goods from nylon and similar fabrics.

The coal resin which I incorporate with isobutene-diolefin rubbery copolymers in accordance with my invention is derived from resin-bearing coals such as those found in extensive deposits in Utah. These coals, particularly those obtained from the Utah deposits, contain substantial percentages (up to 5% and more) of such resinous material, which can be separated and recovered therefrom in various manners. In accordance with the present invention, the resin is preferably employed in a coal-free condition. It can advantageously be recovered from the coal by the following two-stage procedure:

The resin is first separated from the bulk of the coal by aqueous flotation as described, for example, in Green, 1,773,997. The resulting resin concentrate, which still contains an appreciable proportion of coal (up to 15 to 20%) admixed therewith, is then extracted with a solvent composed essentially of saturated hydrocarbons having 6 or less carbon atoms, hexane being a preferred solvent, in accordance with the disclosure of the copending Lee application, Serial No. 515,804, filed December 27, 1943 now abandoned, to provide a filterable solution. The insoluble material including the coal is separated from the resulting resin solution by filtration, and the extracted resin itself is then recovered in a substantially coal-free condition by vaporization of the solvent from the solution. If a light-colored resin product is desired, the resin solution may be additionally filtered through a bed of activated clay or the like.

A typical Utah-type coal resin, recovered in this manner, is soluble in ethers, petroleum and coal-tar hydrocarbons, and vegetable oils, partially soluble in esters and ketones, and insoluble in the lower alcohols. The following physical and chemical characteristics are typical of a representative Utah-type coal resin which has been recovered by extraction with hexane:

Specific gravity_____ 1.03–1.06
Softening point (mercury method)__ 160° C.
Melting point (mercury method)____ 165°–180° C.
Refractive index_____ 1.544
Physical state_____ Brittle solid
Acid value_____ 6–8
Iodine number_____ 100–140
Molecular weight (average)_____ 1000
Analysis:
  Carbon_____ 86.95%
  Hydrogen_____ 11.10%
  Oxygen_____ 1.95%

The coal resin is advantageously compounded with an isobutene-diolefin rubbery copolymer, particularly an isobutene-butadiene copolymer, in an amount ranging from about 5 to 200% based on the weight of the copolymer. Within this range of proportions the most significant increase in solubility or dispersibility of the copolymer in rubber cement solvents occurs, the greatest reduction in the cold-flow characteristic of isobutene-diolefin copolymers takes place, and the most satisfactory adhesive compositions can be prepared. Less than 5% of the coal resin may be used, but in such case the increase in the solubility of the copolymer, the improvement in the adhesive qualities of the cement, and the reduction in the cold-flow characteristic of the copolymer may be insufficient to be effective. More than 200% of the coal resin may also be used, but in such case the value of the rubbery content of the resulting cement begins to disappear, and there is no corresponding improvement in the composition as an adhesive. Moreover, within this range occurs the greatest increase in toleration of the cement for an extender. In any event, sufficient coal resin should be incorporated with the isobutene-diolefin copolymer to produce a cement having the adhesive characteristics necessary for the desired purpose.

In the preparation of the rubber cement, a master batch of the rubbery copolymer and any extenders, accelerators, and other compounding materials desired may be prepared on a mill, and this master batch can then be added together with additional copolymer, the coal resin, and the necessary solvent to any suitable churning equipment. Advantageously, however, the rubbery copolymer, the coal resin, the compounding material and the necessary solvent are placed directly in any suitable mixing equipment and are mixed therein for the time required to effect complete solution or dispersion of the copolymer, the coal resin and the other ingredients. Milling of the copolymer itself for the purpose of sheeting may be resorted to prior to this operation if the copolymer is initially obtained in pieces too large for convenient handling by the dissolving or dispersing equipment or for efficient solution.

Other organic solvents besides the aliphatic and the aromatic hydrocarbons mentioned herein may be used in the formulation of our improved rubber cements, the choice of solvents being governed by the particular conditions under which the cement is to be used. The solvent selected should, of course, be compatible with the rubbery copolymer and the coal resin and should possess the volatility characteristics requisite for the desired application.

The following examples illustrate typical adhesive formulations of isobutene-diolefin rubbery copolymers compounded with a coal-free Utah-type coal resin:

EXAMPLE 1

The following formulation represents a typical vulcanizable rubber cement prepared from GR-I (a copolymer of isobutene and butadiene manufactured under the wartime rubber program of the Government):

| | Parts by weight |
|---|---|
| GR-I | 20.3 |
| Utah-type coal resin (coal-free) | 5.0 |
| Calcium carbonate | 8.0 |
| Zinc oxide | 1.0 |
| Lithrage | 0.8 |
| Stearic acid | 0.6 |
| Sulfur | 0.3 |
| Benzene | 64.3 |

The rubbery copolymer, the coal resin, and the other solid ingredients are dissolved and/or dispersed in the solvent, and the resulting mixture is agitated for several hours until all the solid ingredients are dissolved or dispersed in the benzene. The resulting cement possesses excellent adhesive qualities.

EXAMPLE 2

Another typical formulation is represented by the following:

| | Parts by weight |
|---|---|
| GR-I | 14.48 |
| Utah-type coal resin (coal-free) | 14.48 |
| Carbon black | 7.24 |
| Zinc oxide | 0.72 |
| Sulfur | 0.17 |
| Zinc diethyl dithiocarbamate | 0.14 |
| Diphenyl guanidine | 0.01 |
| Toluene | 60.00 |

The several ingredients are compounded in the manner described in Example 1. The resulting composition comprises a general adhesive suitable for use as a shoe cement.

EXAMPLE 3

A rubber cement containing a very high proportion of coal resin to GR-I is represented by the following formulation:

| | Parts by weight |
|---|---|
| GR-I | 20.0 |
| Utah-type coal resin (coal-free) | 30.0 |
| Blanc fixe | 8.0 |
| Zinc oxide | 1.0 |
| Red lead | 0.8 |
| Stearic acid | 0.6 |
| Sulfur | 0.3 |
| Petroleum naphtha | 60.0 |

This composition is prepared in the same manner as described in Examples 1 and 2 and is useful for coating fabrics and as a seam-sealant for rubberized fabrics.

The following tables indicate the effect of the Utah-type coal resin in increasing the tolerance of an isobutene-diolefin rubber cement for an extender or filler. Table I presents adhesion data for such a cement without the coal resin, and Table II, for such a cement with the coal resin. The extender in each case comprised a soft clay. The formulation utilized in Table I was (parts by weight):

| | |
|---|---|
| GR-I, grade C | 100 |
| Pigment | 20 |
| Accelerator | 7 |
| Zinc oxide | 5 |
| Sulfur | 2.5 |
| Soft clay | 25–175 |

The formulation utilized in obtaining the data in Table II was the same except that 15 parts of GR-I were replaced by a coal-free Utah-type coal resin.

In each case the pounds adhesion were determined by subjecting a two-ply fabric to testing in a Suter pendulum-type tensile tester. The two-ply fabric comprised a 64 x 56 cloth combined with an 80 x 80 cloth, both cloths having been coated with the cement, air-dried, and then combined, force-dried at 180° F., and cured in a hot-air oven at a temperature of 270° F. for two hours.

TABLE I

*Soft clay alone*

| Load | Pounds Adhesion | Average |
|---|---|---|
| 25 | 21.0–22.4 | 21.8 |
| 50 | 19.5–21.5 | 20.5 |
| 75 | 18.5–20.5 | 19.5 |
| 100 | 18.5–18.0 | 18.3 |
| 125 | 16.5–15.5 | 16.0 |
| 150 | 15.5–14.5 | 15.0 |
| 175 | 13.0–15.0 | 14.0 |

TABLE II

*Soft clay and coal resin*

| Load | Pounds Adhesion | Average |
|---|---|---|
| 25 | 26.5–27.5 | 27.0 |
| 50 | 28.5–28.5 | 28.5 |
| 75 | 29.5–31.0 | 30.3 |
| 100 | 27.0–27.5 | 27.3 |
| 125 | 25.3–26.0 | 25.7 |
| 150 | 19.5–20.0 | 19.8 |
| 175 | 16.0–16.0 | 16.0 |

The adhesion of the coal resin-containing cement increased with the addition of soft clay thereto up to 75 parts by weight whereas the adhesion of the straight cement steadily decreased with an increase in the amount of soft clay extender added thereto. With 150 parts of extender the coal resin-containing cement had approximately the same adhesion as the straight cement with only 75 parts of extender.

Similar results are obtained when other extenders such as hard clay or ground natural calcium carbonate are used.

I claim:

1. An adhesive composition comprising a solution in an organic solvent therefor of an isobutene-diolefin rubbery copolymer and 5 to 200%, based on the weight of the copolymer, of a resin consisting essentially of carbon and hydrogen, having an average molecular weight of 1,000 and a refractive index of 1.544 and occurring in Utah resin-bearing coals.

2. The adhesive composition as claimed in claim 1, in which the isobutene-diolefin rubbery copolymer comprises an isobutene-butadiene rubbery copolymer.

3. In the preparation of a solution of an isobutene-diolefin rubbery copolymer in an organic solvent therefor, the step which comprises dissolving the rubbery copolymer in the organic solvent in the presence of 5 to 200%, based on the weight of the copolymer, of a resin consisting essentially of carbon and hydrogen, having an average molecular weight of 1,000 and a refractive index of 1.544 and occurring in Utah resin-bearing coals.

4. The method as claimed in claim 3, in which the isobutene-diolefin rubbery copolymer comprises an isobutene-butadiene rubbery copolymer.

5. A composition comprising an isobutene-diolefin rubbery copolymer and 5 to 200%, based on the weight of the copolymer, of a resin consisting essentially of carbon and hydrogen, having an average molecular weight of 1,000 and a refractive index of 1.544 and occurring in Utah resin-bearing coals.

6. The composition as claimed in claim 5, in which the isobutene-diolefin rubbery copolymer comprises an isobutene-butadiene rubbery copolymer.

LINO J. RADI.

REFERENCES CITED

The following references are of record in the file of this patent:

UNITED STATES PATENTS

| Number | Name | Date |
| --- | --- | --- |
| 2,364,090 | Nagelvoort | Dec. 5, 1944 |
| 2,377,647 | Pragoff | June 5, 1945 |
| 2,382,731 | Little | Aug. 14, 1945 |

OTHER REFERENCES

Nagelvoort Chem. & Met. Eng. 49, No. 10, pages 80–82, (1942).

Certificate of Correction

February 15, 1949.

Patent No. 2,461,552.

LINO J. RADI

It is hereby certified that error appears in the printed specification of the above numbered patent requiring correction as follows:

Column 5, line 8, Example 1, for "GR-I----------20.3" read $GR\text{-}I$--------$20.0$; and that the said Letters Patent should be read with this correction therein that the same may conform to the record of the case in the Patent Office.

Signed and sealed this 5th day of July, A. D. 1949.

[SEAL]

THOMAS F. MURPHY,
*Assistant Commissioner of Patents.*